United States Patent [19]

Assouline et al.

[11] 4,222,636
[45] Sep. 16, 1980

[54] LIQUID CRYSTAL MIXTURE AND ITS APPLICATION TO OPTICAL MODULATION

[75] Inventors: Georges Assouline; Michel Hareng; Eugène Leiba, all of Paris, France

[73] Assignee: Thomson-CSF, Paris, France

[21] Appl. No.: 887,737

[22] Filed: Mar. 17, 1978

Related U.S. Application Data

[63] Continuation of Ser. No. 564,822, Apr. 2, 1975, abandoned, and a continuation of Ser. No. 403,561, Oct. 4, 1973, abandoned.

[30] Foreign Application Priority Data

Oct. 10, 1972 [FR] France .................................. 72.35854

[51] Int. Cl.² .............................................. G02F 1/13
[52] U.S. Cl. .................................. 350/350 R; 252/299
[58] Field of Search ................. 252/299; 350/350, 347, 350/331

[56] References Cited

U.S. PATENT DOCUMENTS

| 3,700,306 | 10/1972 | Cartmell et al. | 350/341 |
| 3,815,972 | 6/1974 | Hsieh | 350/350 |
| 3,918,796 | 11/1975 | Fergason | 350/331 |

FOREIGN PATENT DOCUMENTS

| 2024269 | 2/1971 | Fed. Rep. of Germany | 252/299 |
| 47-31883 | 11/1972 | Japan | 252/299 |

OTHER PUBLICATIONS de Jeu et al.: "Electrohydrodynamic Instabilities in Some Nematic Azoxy Compounds with Dielectric Anisotropies of Different Sign", *Journal of Chemical Physics*, vol. 56, pp. 4752–4755, May 15, 1972.

*Primary Examiner*—Edward S. Bauer
*Attorney, Agent, or Firm*—Roland Plottel

[57] ABSTRACT

The present invention relates to a liquid crystal mixture exhibiting a very short turn-on time of electrically controlled optical phenomena, such as the variation in double-refraction. Said mixture comprises two liquid crystal elements having dielectric anisotropy values chosen to be almost the same but of opposite sign; the value of the resultant dielectric anisotropy is very small.

3 Claims, No Drawings

LIQUID CRYSTAL MIXTURE AND ITS APPLICATION TO OPTICAL MODULATION

This application is a continuation of U.S. applications Ser. No. 403,561 filed Oct. 4, 1973, and Ser. No. 564,822 filed Apr. 4, 1975, both abandoned.

The present invention relates to liquid crystal mixtures, intended more particularly for use in optical modulators and electrically controlled display devices.

It is well known, for the building of display devices, to use thin liquid crystal films whose optical properties in the nematic phase, change under the action of an electric biasing field. For example, the so-called dynamic scattering effect is used which, produced by a sufficiently strong electric biasing voltage, causes that part of an initially transparent liquid crystal film, which is subjected to said voltage, to diffuse the incident light, thus making it possible to display images or characters. Also utilised is the phenomenon of double-refraction produced under the effect of a sufficiently strong electric field, which phenomenon makes it possible to operate in a chromatic polarisation mode and successively display data, with a persistence effect, by a time division multiplex method.

When one of these devices is utilised to display numerous symbols or characters, it is generally required that the turn-on time of the aforementioned phenomena (dynamic scattering or variation in the double refraction) in the liquid crystal film should be very short, this in order that the display device has a maximum capacity as illustrated below.

In accordance with the present invention, there is provided a liquid crystal mixture comprising at least two liquid crystal elements having dielectric anisotropy values of mutually opposite signs; said mixture having a resultant dielectric anisotropy value substantially smaller than said dielectric anisotropy values.

In accordance with a preferred embodiment of the invention these liquid crystal elements are two in number and are operative in the mixture in proportions such that the resultant material has a very small dielectric anisotropy. In the nematic phase of such a material, and under conventional conditions of operation as described hereinafter, the time of establishment of the variation in the double refraction phenomenon is short, since it is found to be a rising function of the coefficient of anisotropy of the mixture.

For a better understanding of the present invention and to show how the same may be carried into effect, reference will be made to the ensuing description:

It should be remembered that the term "liquid crystal" is applied to certain special forms of molecular organisation; these forms of organisation, intermediate between the ordered state of a crystal and the disorder of a liquid, manifest themselves by the occurrence of a viscous state for certain bodies, this within a determinate temperature range. Nematic liquid crystals are characterised by the alignment of the elongated molecules which constitute them, parallel to their own longitudinal direction.

A liquid crystal cell designed to display a character, here referred to as an elementary cell, is conventionally constituted by a thin film of liquid crystal arranged between two glass plates disposed parallel to each other and each partially or wholly coated with an electrode, one of said two electrodes at least, being transparent. One of the electrodes, at least, is also cut to accord with the geometric shape of the character which is to be displayed. The application of a voltage between these two electrodes makes it possible, by the electro-optical mechanisms hereinbefore referred to (dynamic scattering or variation in double refraction), to display the said geometric shape by suitable illumination.

It is possible to manufacture cells, hereinafter referred to as composite cells, which enables the selective display of one of several (p) possible alphanumerical characters. One of the electrodes totally covers one face of the cell and the other electrode, instead of being cut to accord with the shape of the single character which is capable of display in an elementary cell, is then split into small end segments which can be combined with one another in p different ways, in order to furnish the geometric shapes of p characters. The control of this kind of composite cell is achieved by applying on the one hand a potential $V_c$ to the common electrode and, on the other hand, applying a potential $V_1$ to those of the segments belonging to the combination which forms the desired character (hereinafter for convenience, called "useful segments"). The potentials $V_c$ and $V_1$ are chosen so that each is less than but their sum greater than, a threshold value $V_s$ beneath which the electrical optical phenomenon utilised for this display, does not occur. This value $V_s$ depends in particular on the structure of the liquid crystal constituting the cell.

In order to obtain the display of messages or numerical data comprising N characters, panels of N identical composite cells are made up, each enabling the display of one of p alphanumerical characters. Control of panels of this kind is effected sequentially utilising the phenomena of retinal persistence, by the method known as time-division multiplexing. The identical segments of each cell are connected in series and thus constitute n "lines". The common electrode of each cell is placed at the potential $V_c$ for a period of time t. During this time t a potential $V_1$ is applied to the lines carrying the useful segments of the cell in question, which segments alone, then produce an optical signal $V_1$ and $V_c$ each being less than the threshold $V_s$. In this fashion, by successively placing each of N electrodes at the potential $V_c$ for a time t, sequential display of each of the N characters is achieved; at the end of a time $T=Nt$, the complete message has been displayed and it is possible to produce an impression of visual continuity by repeating this kind of cycle at a periodicity T of less than around 50 ms, this due to the retinal persistence of the human eye.

A variant mode of operation of panels of this kind, which in no way modifies their principle, consists in applying a permanent potential to the segments and to the common electrode of all the cells, respectively the potentials $V_2$ and $V_3$, the values of which being such that, as before, only the useful segments are subjected to a potential difference, known as the control potential, in excess of the threshold $V_s$. The advantage of this variant embodiment is that it is then possible to utilise a control potential in excess of $2V_s$ which is a limiting value of the case where said control potential is equal only to $V_c+V_1$.

By means of the time-division multiplex method, control of the display of data comprising N characters can thus be achieved with the help of a single electronic system known as a character generator, connected to the lines of the panel and comprising at least one supply, a clock and a logic system making it possible to select the lines in accordance with external control. The number N thus represents the multiplexing capacity of the panel. For obvious reasons of simplification of the electronic part of the device, it is desirable that this number N should be as large as possible. The number depends upon the times, T and t, which are themselves a function of the characteristics of the crystal used; in particular, the shorter the turn-on time ($t_m$) of establishment of the electro-optical phenomenon utilised, the shorter can be the time t and consequently the larger can be the number N.

In the case where an electro-optical phenomenon is utilised which produces a field effect, such as the aforedescribed double refraction change, or again when utilising a twisted nematic liquid crystal, calculations show and experience confirms, the following results.

(1) The turn-on time $t_m$ is a rapidly decaying function of the interval between the control potential and the threshold potential $V_s$ (2) The threshold potential $V_s$ varies as $1/\sqrt{\epsilon_a}$ where $\epsilon_a$ is the dielectric anisotropy of the crystal in question, defined by the difference $\epsilon_\| - \epsilon_\perp$ these being respectively the values of the dielectric constant of the material, parallel and at right angles to the electric control field applied to it. Knowing that in practice the value chosen for the control potential is of the order of $3V_s$, it is evident from the foregoing that the turn-on time $t_m$ is a rising function of $\epsilon_a$.

The mixture in accordance with the invention, in a preferred embodiment, is a mixture of two liquid crystal elements having dielectric anisotropy values respectively equal to $\epsilon_{a1}$ and $\epsilon_{a2}$. The signs of these values are opposite and the moduli are almost the same, so that the dielectric anisotropy $\epsilon_a$ of the resultant material is substantially zero.

The proportions $x_1$ and $x_2$ of the two elements constituting the active part of the mixture, are given roughly by the following expressions:

$$x_1 \cdot \epsilon_{a1} + x_2 \cdot \epsilon_{a2} = 0$$

$$x_1 + x_2 = 1$$

More accurate proportions can be determined experimentally.

By way of example, a display device constructed with the help of a nematic material in accordance with the invention, constituted by a mixture of 40% methoxybenzlidenebutylaniline (or MBBA), and 60% of p-butylazoxybenzene, has a coefficient $\epsilon_a$ of +0.2, leading to a multiplex capacity more then two times better than that of a device which utilises MBBA alone, whose coefficient $\epsilon_a$ is $-0.4$.

What we claim is:

1. In a method of optically modulating radiant energy which comprises the steps of electrically biasing a film of a liquid crystal in the nematic phase receiving said radiant energy; the step of decreasing the turn-on-time for said modulation by utilizing as said crystal a liquid crystal mixture comprising 40% of methoxybenzylidenebutylaniline(MBBA) and 60% of p-butylazoxybenzene each having dielectric anisotropy values of mutually opposite signs; said mixture having a resultant dielectric anisotropy value of +0.2 which is substantially smaller than each of said dielectric anisotropy values.

2. In a method of optically modulating radiant energy which comprises the steps of electrically biasing a film of liquid crystal in the nematic phase receiving said radiant energy; the step of decreasing the turn-on-time for said modulation by utilizing a liquid crystal mixture comprising at least two liquid crystal compounds each having dielectric anisotropy values, $Ea_1$ and $Ea_2$ of mutually opposite signs; said mixture having a resultant numerical dielectric anisotropy value substantially smaller than each said dielectric arisotropy values, with $x_1Ea_1 + x_2Ea_2 = +0.2$; and $x_1 + x_2 = 1$ where $x_1$ and $x_2$ are the proportions of the two compounds, said resultant dielectric value being $\simeq +0.2$, thus requiring a larger electrical bias and thus providing a faster response time than for larger values of dielectric anistropy wherein said liquid crystal mixture consists of 40% methoxybenzylidenebutylanaline and 60% p-butylazoxybenzene and said resultant dielectric anisotropy is about +0.2.

3. A method of obtaining fast turn-on-time from composite liquid crystal cells series interconnected in a panel, including the steps of manufacturing the liquid crystal cells with at least two liquid crystal compounds in the nematic phase whose resultant mixture has a dielectric anisotropy value close to zero, thus requiring a larger threshold voltage to change said liquid crystals optical porperties than if said anisotropy value were larger, and which mixture switches faster for larger applied voltage and thus changing said optical properties, wherein said compounds are 40% methoxybenzylidenebutylaniline and 60% p-butylazoxybenzene, and the resultant dielectric anisotropy is +0.2.

* * * * *